C. D. SCOFIELD & G. F. KEARNEY.
KETTLE COVER.
APPLICATION FILED SEPT. 20, 1915.
1,204,704.
Patented Nov. 14, 1916.
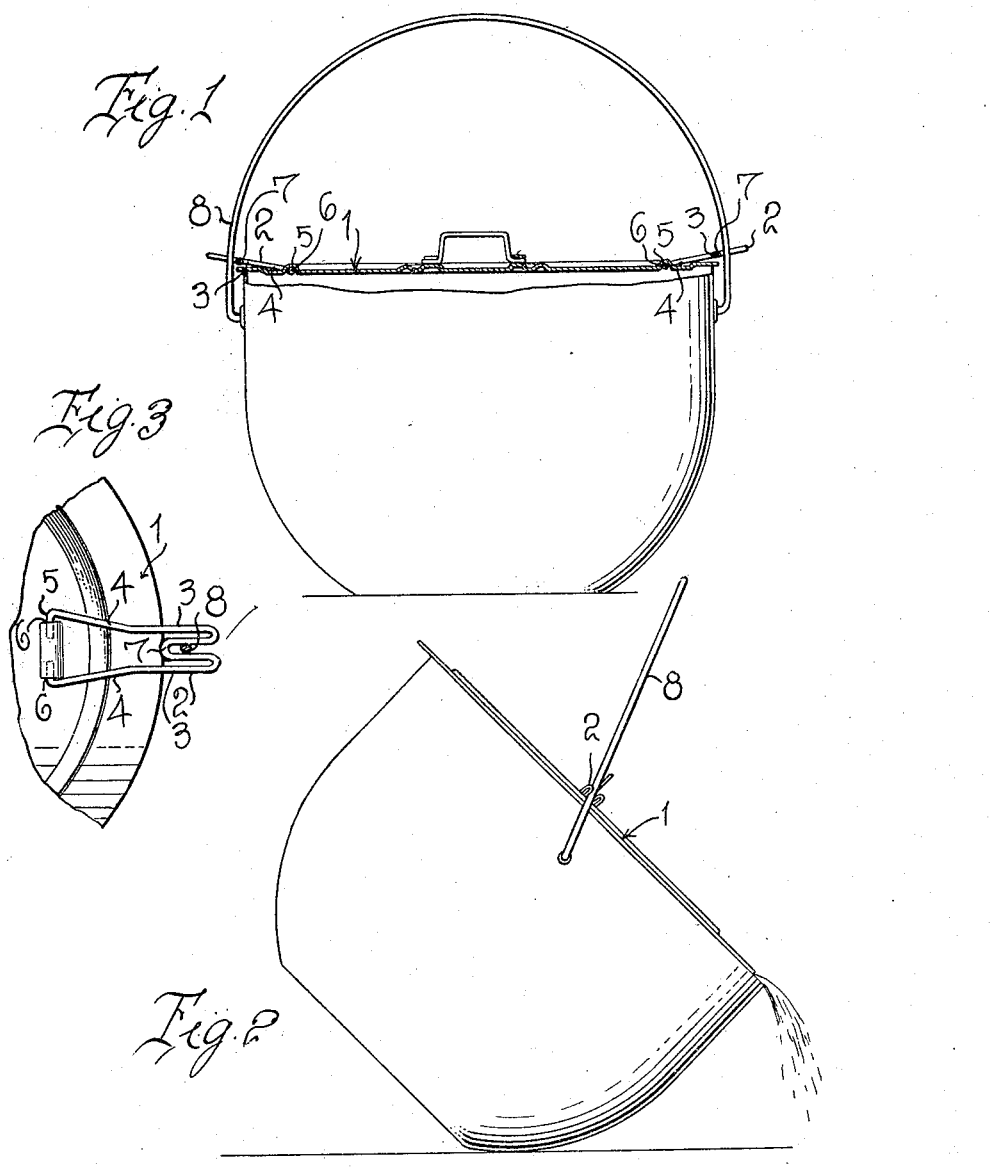
Inventors
C. D. Scofield,
G. F. Kearney.
By Watson E. Coleman
Attorney

UNITED STATES PATENT OFFICE.

CHARLES D. SCOFIELD AND GEORGE F. KEARNEY, OF GORHAM, NEW YORK.

KETTLE-COVER.

1,204,704.   Specification of Letters Patent.   Patented Nov. 14, 1916.

Application filed September 20, 1915. Serial No. 51,640.

*To all whom it may concern:*

Be it known that we, CHARLES D. SCOFIELD and GEORGE F. KEARNEY, citizens of the United States, residing at Gorham, in the county of Ontario and State of New York, have invented certain new and useful Improvements in Kettle-Covers, of which the following is a specification, reference being had to the accompanying drawings.

This invention comprehends certain new and useful improvements in table and kitchen articles and relates particularly to covers for kettles, pots and the like.

As every housekeeper knows, burns are often sustained in the use of kettles or similar utensils having swinging bails attached thereto, due to the fact that in the heating of the contents of the kettle on the stove or range, no means are provided for holding the bail in raised position out of contact with the hot kettle, and with a knowledge of these conditions, our invention has for its primary object an efficient construction of kettle cover provided with means whereby the bail may be conveniently held out of contact with the hot wall of the kettle.

A further object of the invention is a device of this character which will not appreciably add to the cost of manufacture of the kettle cover and which is so constructed and arranged that it provides means whereby the cover can be held in a slightly raised position at one side or the other so that the kettle may be drained or the contents poured therefrom without the necessity of touching the cover and receiving burns which such contact by the hands might result in. And the invention also aims to generally improve devices of this class so as to render them more useful and commercially desirable.

With these and other objects in view as will more fully appear as the description proceeds, the invention consists in certain constructions, arrangements, and combinations of the parts that we shall hereinafter fully describe and claim.

For a full understanding of the invention reference is to be had to the following description and accompanying drawing, in which—

Figure 1 is a side elevation of a kettle showing the application of our improved cover thereto, the cover being shown in section. Fig. 2 is a similar view showing the position of the cover in draining or pouring out the contents of the kettle. Fig. 3 is a fragmentary plan view of the device.

Corresponding and like parts are referred to in the following description and designated in all of the views of the accompanying drawing by like reference characters.

Referring to the drawing, the numeral 1 designates our improved kettle cover, which may be of any desired size, shape and construction except as hereinafter noted, and which is provided, preferably at diametrically opposed points with bail holding members 2 as shown. In the present embodiment of the invention, each of these bail holding members consists of a single piece of wire doubled upon itself intermediate of its ends to form substantially parallel arms 3, the extremities of which are turned outwardly as indicated at 4 and then bent inwardly toward each other to form portions of an attaching cross bar 5 by which the member may be hingedly secured to the cover 1 in any desired way, as for example, by having the inturned ends of the cross bar 5 engaged in openings 6 with which the kettle cover is provided, or straps of metal or the like may be soldered to the kettle 1 and these ends engaged thereunder if desired.

It is to be particularly noted, as clearly illustrated in Figs. 1 and 3, that the arms 3 are of such a length and are connected to the lid 1 at such distances from the edge thereof that when the bail holding members are projected outward for engagement with the bail, their sockets 7 will readily receive the bail 8, and at the same time the bail can be very readily released from the lid or cover 1 by merely swinging the bail holding members 2 upward and inward. It will also be seen that the sockets 7 are of such a depth that they extend inward from the bail when the bail is vertically disposed relative to the kettle, pot or the like, and when the bail holding members are projected outward in their operative positions, whereby the bail may have easy sliding movement relative to the sockets, when the bail and kettle are disposed in angular relation to each other, as illustrated in Fig. 2, whereby the parts will not bind at all, but will facilitate the desired operation.

In connection with the bail holding members 2, the cover 1 is preferably provided with a loop handle 9 hingedly connected thereto and provided at one extremity with a laterally turned end 10 designed to engage the upper surface of the kettle whereby the handle will be prevented from falling down flat upon the cover and thus may be readily grasped without one's hand coming into contact with the cover itself.

While the accompanying drawing illustrates what we believe to be the preferred embodiment of our invention, it is to be understood that the invention is not limited thereto but that various changes may be made in the construction, arrangement and proportions of the parts without departing from the scope of the invention as defined in the appended claim.

We claim:

A cover for kettles and the like, provided at diametrically opposite points with bail holding members, each of which consists of a single piece of wire bent intermediate of its ends to form substantially parallel arms and crimped inwardly at one end of said arms to form bail receiving sockets, the other ends of said arms being pivotally connected to the cover at a point contiguous to the adjacent portion of the edge thereof and the arms being of a length greater than the distance between the point of connection and said edge, and the sockets being elongated and arranged to permit of a sliding movement of a bail therein longitudinally of the socket.

In testimony whereof we hereunto affix our signatures in the presence of two witnesses.

CHARLES D. SCOFIELD.
GEORGE F. KEARNEY.

Witnesses:
CHAS. L. CROSIER,
CLARENCE W. SCOFIELD.